United States Patent [19]
Sasaki et al.

[11] Patent Number: 5,979,611
[45] Date of Patent: Nov. 9, 1999

[54] DISC BRAKE DEVICE

[75] Inventors: Keiji Sasaki; Katsuhiro Uchiyama, both of Nagoya, Japan

[73] Assignee: Nisshinbo Industries, Inc., Tokyo, Japan

[21] Appl. No.: 08/907,629

[22] Filed: Aug. 8, 1997

[30]      Foreign Application Priority Data

Aug. 26, 1996 [JP] Japan ................................. 8-223648

[51] Int. Cl.$^6$ ................................................. F16D 65/14
[52] U.S. Cl. ............................ 188/73.43; 188/73.39; 188/73.32; 188/205 A
[58] Field of Search ........................ 188/73.39, 73.31, 188/205 R, 205 A, 206 A, 206 R, 72.4, 71.1, 72.5, 73.32, 73.34, 73.33, 73.44, 73.43, 73.45, 73.46, 73.47, 264 A, 264 AA, 71.6; D12/179, 180

[56]             References Cited

U.S. PATENT DOCUMENTS

| | | | |
|---|---|---|---|
| 4,220,224 | 9/1980 | Karasudani | 188/73.39 |
| 4,261,444 | 4/1981 | Caplygin | 188/73.39 |
| 5,188,202 | 2/1993 | Terashima | 188/73.45 |
| 5,535,856 | 7/1996 | Mc Cormick et al. | 188/205 A |
| 5,564,532 | 10/1996 | Baba et al. | 188/73.39 |

FOREIGN PATENT DOCUMENTS

| | | | |
|---|---|---|---|
| 0 382 698 | 8/1990 | European Pat. Off. . | |
| 2440076 | 3/1976 | Germany | 188/73.39 |
| 21 67 012 | 7/1977 | Germany . | |
| 3141598 | 10/1982 | Germany | 188/73.45 |
| 3613346 | 10/1987 | Germany | 188/73.47 |
| 52-29390 | 3/1977 | Japan . | |
| 54-93768 | 7/1979 | Japan . | |
| 55-44200 | 3/1980 | Japan . | |
| 55-90726 | 7/1980 | Japan | 188/73.39 |
| 56-143825 | 11/1981 | Japan . | |
| WO 91/13267 | 9/1991 | WIPO . | |

*Primary Examiner*—Douglas C. Butler
*Attorney, Agent, or Firm*—Young & Thompson

[57]             ABSTRACT

A torque member has thread holes for attaching itself to a vehicle body and L-shaped rails for supporting inner and outer brake pads in the circumferential direction of a disc rotor, so as to allow the brake pads to be displaced in the axial direction of the disc rotor. Those of the L-shaped rails which face one another in the axial direction of the disc rotor are cross-linked by two bridge parts at their outer ends as viewed in the radial direction of the disc rotor. A corresponding caliper bridge part fits between the two bridge parts. The L-shaped rails facing in the circumferential direction of the disc rotor are connected together at their inner ends as viewed in the radial direction of the disc rotor by beams.

2 Claims, 5 Drawing Sheets

FIG_4

DISC BRAKE DEVICE

BACKGROUND OF THE INVENTION

1. Field of the Invention

The present invention relates to a floating caliper type disc brake device suitably adapted for heavy vehicles such as a commercial vehicle, and in particular to a torque member which forms an essential part of the disc brake device.

2. Description of Related Art

A disc brake device clamps a disc rotor which is rotated together with a rotating body to be braked, on both sides of the disc rotor in the axial direction of the latter, with a pair of brake pads so as to brake the disc rotor.

Furthermore, the pair of brake pads are circumferentially held in brake pad supporting parts of a torque member so as to be displaceable in the axial direction of the disc rotor while the torque member is attached to a vehicle body at its one side in the axial direction of the disc rotor so as to receive a torque which is transmitted thereto from the disc rotor through the brake pad supporting parts upon braking.

It is noted that the pressing of the pair of brake pads against the disc rotor is carried out by a caliper which is supported on the above-mentioned torque member so as to be displaceable in the axial direction of the disc rotor in the case of a floating caliper type disc brake device.

By the way, in the case of a floating caliper type disc brake device for a heavy vehicle, the energy to be braked is large. Accordingly, a torque transmitted to the torque member from the disc rotor through the brake pad supporting parts is also large, so that it is required to enhance the rigidity of the torque member.

In order to enhance the rigidity, it has been conventionally proposed, as disclosed, for example, in Japanese Patent Laid-Open Publication No. 55-44,200, to take the following countermeasure for the torque member.

That is, as shown in FIG. 5, a torque member b attached at its part a to the vehicle body and supporting a caliper which is not shown and which is floatable in the axial direction of a disc rotor by means of a pin guide mechanism planted in a part c, includes brake pad supporting parts d and bridge parts e each of which couples two of the brake pad supporting parts d opposed in the axial direction of the disc rotor, and which are connected to together by a cross-linking part f laid along the outer periphery of the disc rotor, thereby the above-mentioned counter measure for the torque member b can be made.

The brake pad supporting parts d on the outer side remote from the vehicle attached side, is subjected to a force indicated by arrow α when a torque is transmitted to the brake pad supporting parts d from the disc rotor upon braking, and this force α causes the brake pad supporting parts d to be displaced in the rotating direction of the disc rotor.

Since the bridge parts e are coupled therebetween with the cross-linking part f in the above-mentioned conventional torque member b, the above-mentioned outer side brake pad supporting parts d can be restrained at their outer end parts in the radial direction of the disc rotor from being displaced even by the force α.

However, the inner end parts of the outer side brake pad supporting parts d in the radial direction of the disc rotor is not given with a sufficient restraining force even by the cross-linking part f, and accordingly, they are displaced by the force α in the same direction as that of the latter, that is, in the rotating direction of the disc rotor, and further, a mouth opening deformation in a direction indicated by arrow β is unavoidable.

Thus, the conventional torque member b is likely to incline the outer brake pads, causing uneven wear of the outer brake pads.

Further, since the cross-linking part f is laid along the outer periphery of the disc rotor, it has been proposed that it degrades the cooling ability of the disc rotor, and further, the assembling ability of the disc brake device is deteriorated due to the following reasons.

That is, when the disc brake assembly is to be attached to the chassis of a vehicle body, opposite brake pads are spaced from one another by an elastic spacer having a thickness larger than that of the disc rotor and previously interposed between the opposite brake pads, and in this condition, the disc brake assembly is simply fitted from above onto the disc rotor which has been incorporated in the chassis, so as to expel the elastic spacer between the opposite pads by the disc rotor. Thus, it is usual to enhance the assembling ability of the disc brake assembly to the chassis.

However, in the conventional disc brake device, since the cross-linking part f is laid along the outer periphery of the disc rotor, the above-mentioned elastic spacer cannot be removed from the space between the brake pads. Accordingly, the above-mentioned assembling process cannot be used, and as a result the disc brake device is more difficult to assemble.

SUMMARY OF THE INVENTION

The present invention is envisaged in view of the above-mentioned problems inherent to conventional disc brake devices.

It is a primary object of the present invention to propose a disc brake device in which a torque member is improved so that a sufficient restraining force is given even at the inner end parts of outer side brake pad supporting parts in the radial direction of the disc rotor, and the inner end parts of the outer side brake pad supporting parts are prevented from being displaced in the rotating direction of the disc rotor, and from causing deformation of the mouth-opening.

It is another object of the present invention to propose a disc brake device in which a torque member is improved so that the above-mentioned problems as to the cooling ability of a disc rotor and the assembling ability of a disc brake device, can be avoided.

To the end, according to a first aspect of the present invention, there is provided a floating caliper type disc brake device comprising:

pairs of brake pads for clamping a disc rotor from both sides in an axial direction of the disc rotor so as to brake the disc rotor;

a torque member having brake pad supporting parts for circumferentially supporting said pairs of brake pads so as to allow said brake pads to be displaced in the axial direction of the disc rotor, said torque member being attached to a stationary part on one side of the disc rotor as viewed in the axial direction;

a caliper for pressing said pairs of brake pads against the disc rotor, said caliper being supported on the torque member so as to be displaceable in the axial direction of the disc rotor; and bridge parts provided for said torque member, and positioned at both sides of respective bridge parts of the caliper, as viewed in a circumferential direction of the disc rotor, said bridge parts of the caliper being spaced from one another in a peripheral direction of the disc rotor, and spanning over the outer periphery of the disc rotor, wherein those of said brake pad supporting parts of the torque member which face one another in the axial direction of the disc rotor, are cross-linked by said bridge parts.

According to a second aspect of the present invention, there is provided a disc brake device having an arrangement, in addition to that stated with respect to the first aspect of the invention, such that the brake pad supporting parts of the torque member are L-shaped rails so that said brake pads can be inserted and removed in a radial direction of the disc rotor, and those of the bridge parts of the torque member which are nearer to said brake pads cross-link between outer end parts of said L-shaped rails in the radial direction of the disc rotor.

The present invention will be explained in further detail hereinafter, with reference to certain preferred embodiment shown in the accompanying drawings.

DETAILED DESCRIPTION OF THE PREFERRED EMBODIMENTS

Figure 1:
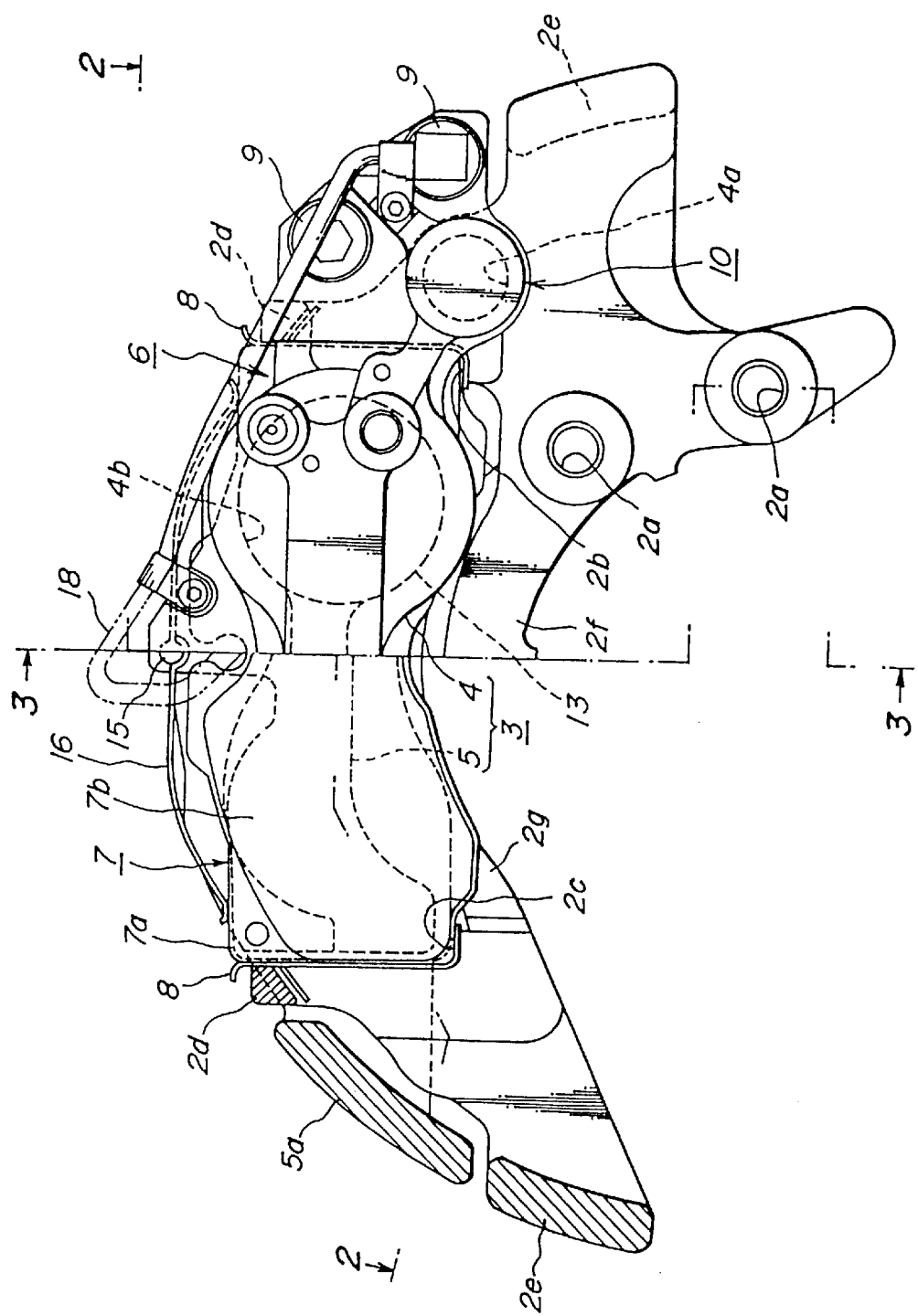
FIG. 1 is a sectional view along line 1—1 in FIG. 2 as viewed in the direction indicated by the arrows, illustrating a disc brake device according to one embodiment of the present invention.

Referring to FIGS. 1 to 4, there is shown a floating caliper type disc brake device according to one preferred embodiment of the present invention, which includes a disc rotor 1 (FIG. 3) fitted on a rotating member (axle) to be braked.

The disc brake device for braking the rotation of the disc rotor 1 is mainly composed of a torque member 2, a caliper 3 and a pair of brake pads 6, 7.

The pair of brake pads 6, 7 serve to clamp the disc rotor 1 therebetween so as to brake the rotation thereof. The brake pads 6, 7 respectively have backing plates 6a, 7a and friction members 6b, 7b which are bonded to the backing plates 6a, 7a and arranged opposite to the disc rotor 1.

Figure 4:
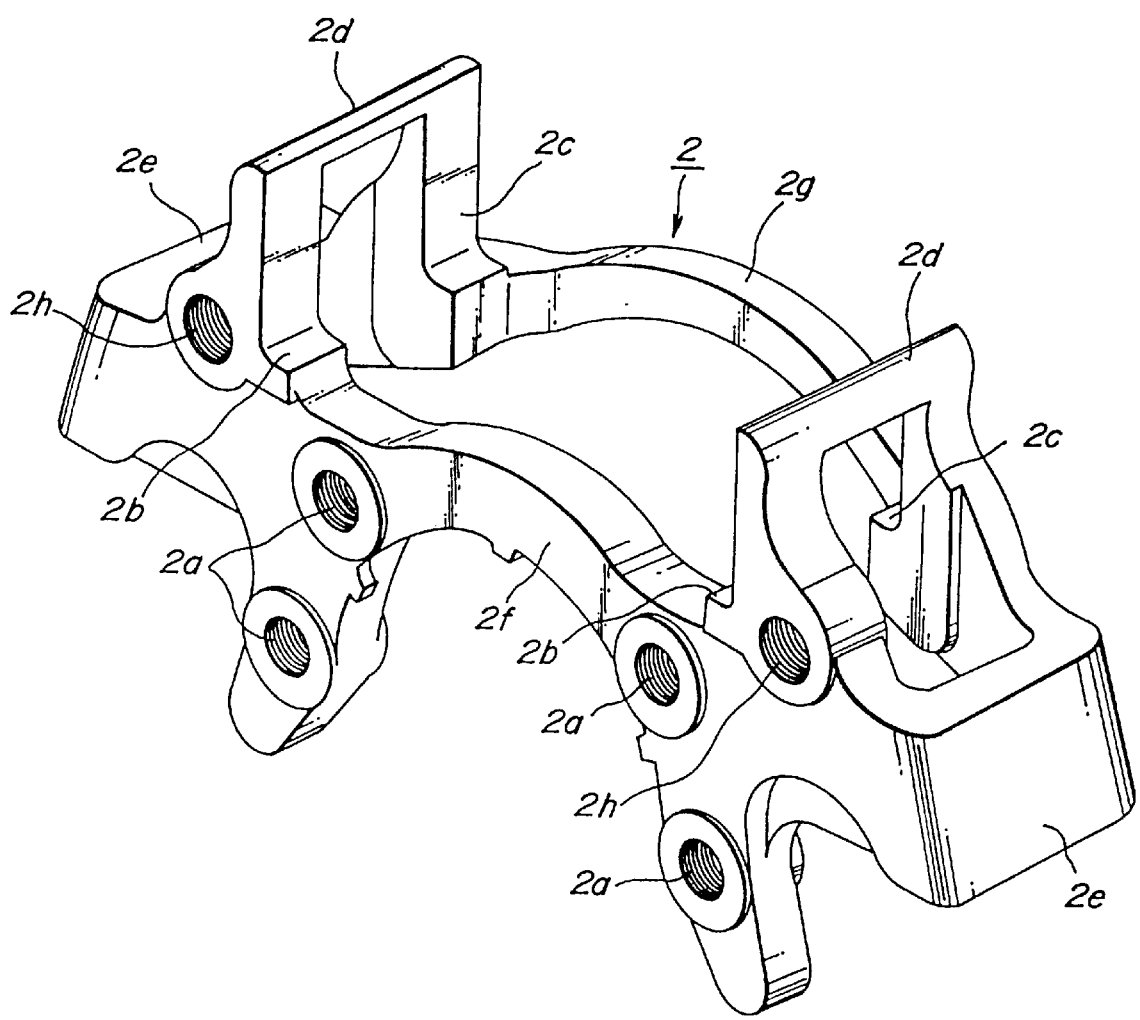
FIG. 4 is a perspective view illustrating a torque member in the embodiment shown in FIG. 1.

The torque member 2, the entirety of which is shown in FIG. 4, is attached at one side as viewed in the axial direction of the disc rotor 1, to a stationary part (i.e., a vehicle chassis, not shown) through screw holes 2a.

Figure 2:
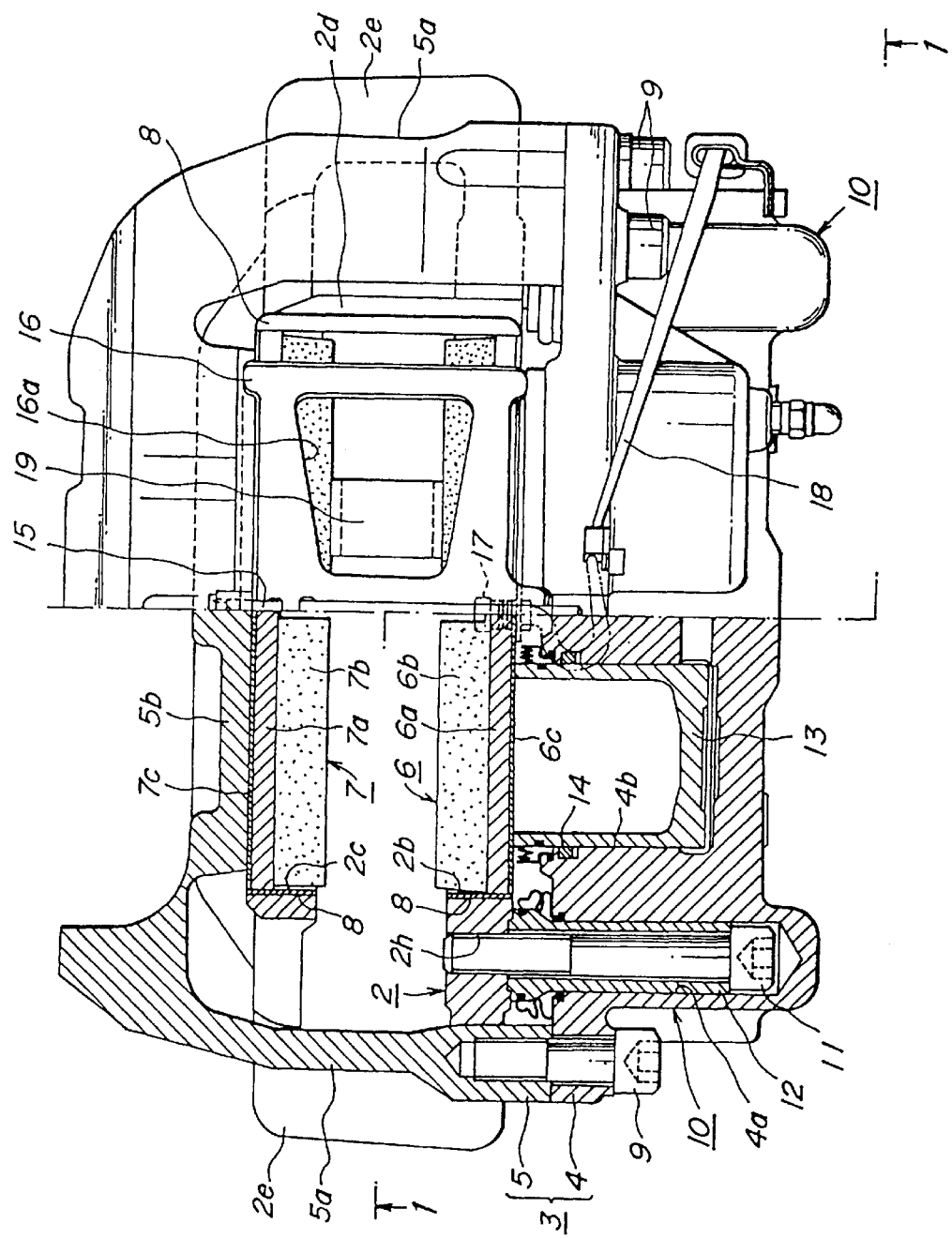
FIG. 2 is a sectional view along line 2—2 in FIG. 1 as viewed in the direction indicated by the arrows; illustrating the disc brake device of the embodiment shown in FIG. 1.

The torque member 2 is provided with L-shaped rails 2b, 2c serving as brake pad supporting parts for circumferentially supporting the backing plates 6a, 7a of the brake pads 6, 7, as clearly shown in FIGS. 1 and 2. The brake pads 6, 7 are displaceable in the axial direction of the disc rotor 1. The L-shaped rails 2b, 2c allow the brake pads 6, 7 to be installed and removed in the radial direction the disc rotor 1, and also serve to determine the insertion limits of the brake pads 6, 7.

Specifically, the L-shaped rail 2b is a brake pad supporting part for supporting an inner brake pad 6 on the side close to a vehicle body attaching part of the torque member 2, at its opposite ends as viewed in the circumferential direction of the disc rotor 1. Similarly, the L-shaped rail 2c is a brake pad supporting part for supporting the other outer brake pad 7 at its opposite ends as viewed in the circumferential direction of the disc rotor 1.

Pad backing plates 8 are interposed between the brake pads 6, 7, and the L-shaped rails 2b, 2c so as to prevent the both components from seizure due to rust or the like, to enhance the wear-resistance therebetween, to prevent vibration of the brake pads 6, 7, and to cause a damping function of the brake pads 6, 7 upon braking.

The torque member 2 is also provided, as clearly shown in FIGS. 1 to 4, with first bridge parts 2d which cross-link between the L-shaped rails 2b, 2c opposed to each other in the axial direction of the disc rotor 1, at the outer ends as viewed in the radial direction of the disc rotor 1.

Second bridge parts 2e are provided so as to cross-link between the L-shaped rails 2b, 2c at positions which are spaced from each other in the circumferential direction of the disc rotor 1, and distant from the first bridge parts 2d.

Figure 3:
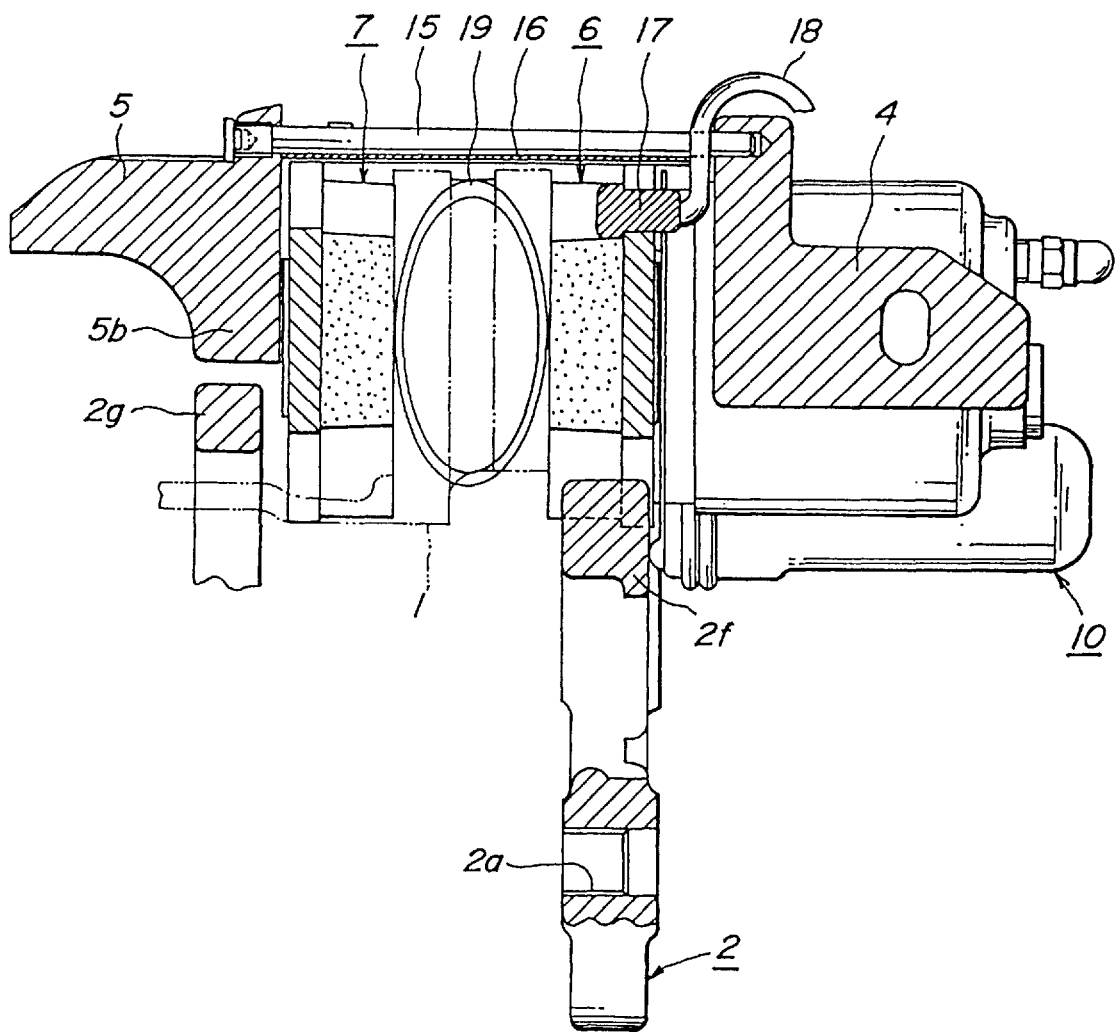
FIG. 3 is a sectional view along line 3—3 in FIG. 1 as viewed in the direction indicated by the arrows, illustrating the disc brake device of the embodiment shown in FIG. 1.

The torque member 2 is provided, as clearly shown in FIGS. 1, 3 and 4, respectively with beams 2f, 2g which connect, at their inner ends as viewed in the radial direction of the disc rotor 1, between the L-shaped rails 2b and 2c. The beams 2f, 2g are opposed to each other in the circumferential direction of the disc rotor 1. In this instance, the beam 2f on the vehicle body attaching part side of the torque member 2 serve as an inner beam, and the other beam 2g serve as an outer beam.

The caliper 3 presses the inner brake pad 6 on the L-shaped rail 2b of the torque member 2 and the outer brake pad 7 on the L-shaped rail 2c thereof, against the sliding surfaces of the disc rotor 1. The caliper 3 is composed of caliper members 4, 5 which are fastened together by bolts 9 as shown in FIGS. 1 to 3. The caliper 3 is floatably supported on the torque member 2 by a pair of slide guide mechanisms 10 so as to be displaceable in the axial direction of the disc rotor 1.

Explanation will be made hereinafter, of each of the slide mechanisms 10.

A guide bushing 12 is attached to the torque member 2 by means of a bolt 11 which is screwed into a threaded hole 2h (refer to FIGS. 2 and 4) formed in the torque member 2 so as to be planted to the latter. A blind hole 4a is formed in the caliper member 4 laid on that side of the torque member 2 on which it is attached to the vehicle body. The blind hole 4a is slidably fitted on the guide bushing 12 so as to constitute the slide guide mechanism 10.

The caliper member 4 is further provided with a pair of cylinders 4b which face the backing plate 6a of the inner brake pad 6, and a pair of pistons 13 which are made to abut against the backing plate 6a of the inner brake pad 6 through the intermediary of shims 6c are slidably fitted in the cylinders 4 while piston seals 14 are interposed between the pistons 13 and the cylinders 4b.

The caliper member 5 has bridge parts 5a which are spaced from each other in the circumferential direction of the disc rotor 1 and which span over the outer periphery of the disc rotor 1. The caliper member 5 also has a reaction part 5b for pressing the backing plate 7a of the outer brake pad 7 through the intermediary of a shim 7c.

It is noted that the first and second bridge parts 2d, 2e cross-linking between the L-shaped rails 2b, 2c of the torque member 2 which are opposed in the axial direction of the disc rotor 1 are positioned on opposite sides in the circumferential direction of the disc rotor 1, with the corresponding bridge parts 5a of the caliper 5 being interposed therebetween as clearly shown in FIG. 1.

As shown in FIGS. 1 to 3, a pin 15 extends in the axial direction of the disc rotor 1, and is arranged bridging between protrusions of the caliper members 4, 5 which project outward in the radial direction of the disc rotor 1, with a leaf spring 16 being locked at its center to the pin 15. Accordingly, the brake pads 6, 7 are resiliently pressed by the opposite ends of the leaf spring 16 so as to prevent the brake pads 6, 7 from an excessive play and/or coming-off.

It is noted that an indicator 17 for detecting the wear of the brake pads 6, 7 is connected to a warning device in the passenger compartment, through a lead wire 18.

During the assembly of the disc brake device according to the above-mentioned embodiment, an elastic spacer 19 is interposed between the brake pads 6, 7 as shown in FIGS. 2 and 3. The elastic spacer 19 ensures that the brake pads 6, 7 are spaced from each other to define a gap which is slightly larger than the thickness of the disc rotor 1, between the brake pads 6, 7.

In this condition, the assembly of the disc brake device is set over the disc rotor 1 which had already been attached to the chassis of the vehicle body. At this stage, the outer periphery of the disc rotor 1 pushes out the elastic spacer 19 between the brake pads 6, 7 through an openings formed in the torque member 2 and the caliper 3 in the radial direction of the disc rotor 1, and through a window 16a (FIG. 2) formed in the leaf spring 16. Accordingly, the elastic spacer 19 can be automatically removed.

Thereafter, the torque member 2 is attached to the chassis of the vehicle body by bolts screwed into the threaded holes 2a, whereby the installation of the disc brake device is completed.

Next, explanation will be made of the operation of the disc brake device according to the above-mentioned embodiment.

When a brake fluid pressure is fed into both cylinders 4b, the pistons 13 are extended so as to press the inner brake pad 6 against the disc rotor 1. At this time, a reaction force is exerted to the caliper 3 which is therefore displaced in the reversed direction, while being guided by the slide guide mechanisms 10. Accordingly, the reaction part 5b of the caliper member 5 presses the outer brake pad 7 against the disc rotor 1.

Thus, the brake pads 6, 7 clamp therebetween the disc rotor 1 on its both sides as viewed in the axial direction of the disc rotor 1 so as to brake the disc rotor 1.

Upon this braking, a torque inputted to the L-shaped rails 2b, 2c from the disc rotor 1 through the intermediary of the brake pads 6, 7, is born by the vehicle body attaching part of the torque member 2.

Figure 5:
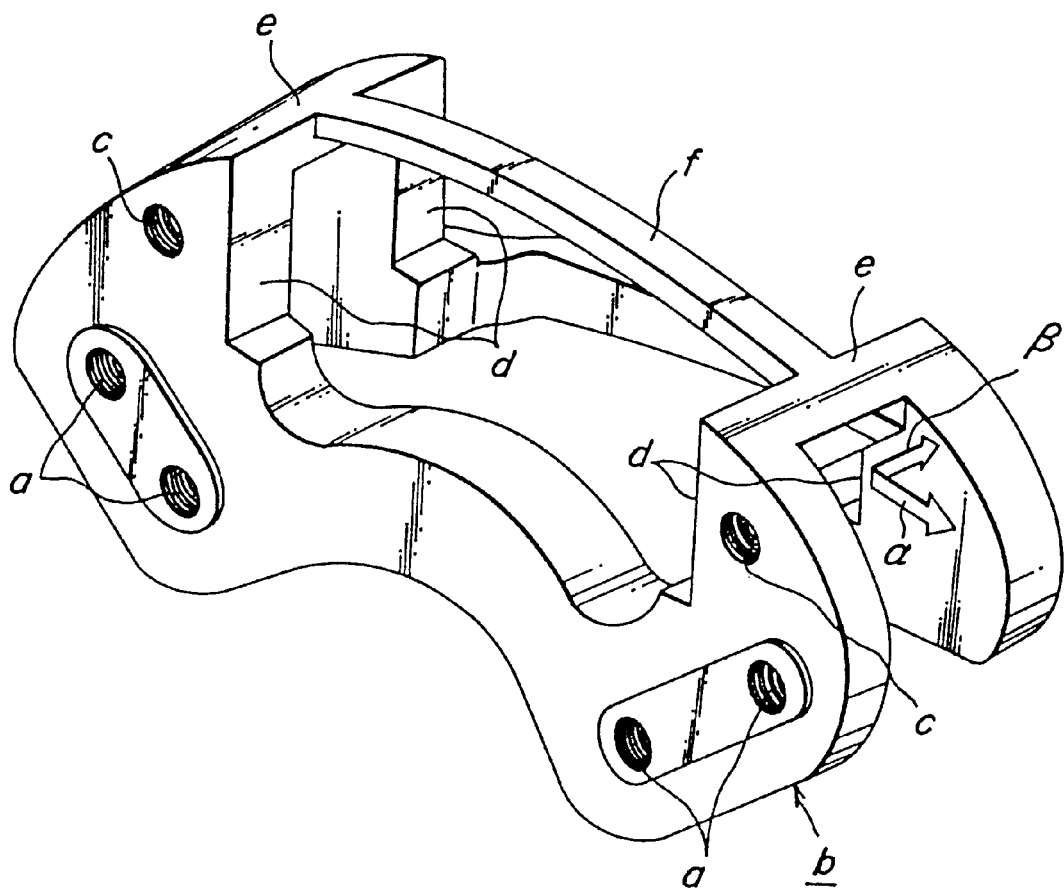
FIG. 5 is a perspective view illustrating a torque member in the conventional disc brake device discussed above.

At this time, consideration is made of a force on the rotating output side of the disc rotor 1, which acts upon the L-shaped rail 2c for supporting the outer brake pad 7 on the side remote from the vehicle body attaching part of the torque member 2, and which is similar to the force indicated by arrow α in FIG. 5, tending to displace the L-shaped rail 2c in the rotating direction of the disc rotor 1.

In the torque member 2 according to the illustrated embodiment, as clearly shown in FIGS. 1 to 4, the L-shaped rails 2b, 2c opposed to each other in the axial direction of the disc rotor 1 are cross-linked by the first and second bridge parts 2d, 2e located on the opposite sides in the circumferential direction of the disc rotor 1, with the bridge parts 5a of the caliper 3 being interposed therebetween. Accordingly, the L-shaped rail 2 for supporting the outer brake pad can be restrained from being displaced at its outer end as viewed in the radial direction of the disc rotor 1, toward the rotating output side of the disc rotor 1 by the above-mentioned force. Similarly, the L-shaped rail 2c can be restrained from being displaced also at its inner end as viewed in the radial direction of the disc rotor 1, toward the rotating output side of the disc rotor 1 by the above-mentioned force. Moreover, the inner end, as viewed in the radial direction of the disc rotor 1, of the L-shaped rail 2c can be restrained from being deformed in a mouth-opening manner in the direction indicated by arrow β shown in FIG. 5. It is therefore possible to solve such a problem that the outer brake pad 7 tends to undergo uneven wear.

In addition to the above, it is noted the L-shaped rails 2b are connected therebetween by the inner beam 2f while the L-shaped rails 2c are connected therebetween by the outer beam 2g in at their inner ends as viewed in the radial direction of the disc rotor 1, in the illustrated embodiment. Accordingly, such a technical effect can be ensured that the displacement of the L-shaped rails 2c at their inner ends as viewed in the radial direction of the disc rotor 1, toward rotating output side of the disc rotor 1, and deformation of the above-mentioned mouth-opening are restrained.

Further, since the above-mentioned countermeasure does not require any component which extends along the outer periphery of the disc rotor 1, the cooling effect of the disc rotor 1 can be prevented from being lowered. Moreover, as clearly understood from the above-mentioned process of assembling the above-mentioned disc brake device, there occurs no such problem that the assembling ability of the disc brake device is lowered.

When the brake fluid pressure to the cylinders 4b is released, the pistons 13 are returned by roll-back force of the piston seals 14 (refer to FIG. 2) so that the brake pads 6, 7 are separated from the disc rotor 1, and accordingly, the braking force can be released.

It is noted that if the friction members 6a, 7b of the brake pads 6, 7 are worn, the pistons 13 are advanced by the corresponding degree, relative to the piston seals 14. It is therefore possible to maintain the clearance between the disc rotor 1 and the brake pad friction members 6a, 7b at a constant value.

With the disc brake device according to the first aspect of the present invention, the torque member 2 is provided with the first and second bridge parts 2d, 2e which are located on the opposite sides, as viewed in the circumferential direction of the disc rotor 1, of the respective bridge parts 5a spaced from each other in the circumferential direction of the disc rotor 1 and spanning over the outer periphery of the disc rotor 1, and which cross-link between the brake pad supporting parts 2b, 2c of the torque member 2 which are opposed to each other in the axial direction of the disc rotor 1. Therefore, a sufficient restraining can be obtained not only at the outer end, as viewed in the radial direction of the disc rotor 1, of the outer brake pad supporting part 2c, but also at the inner end thereof, as viewed in the radial direction of the disc rotor 1. It is thus possible to prevent occurrence of large displacement toward the rotating output side of the disc rotor 1 and also occurrence of large deformation of the mouth-opening in the axial direction of the disc rotor 1.

Accordingly, it is possible to effect such an advantage that uneven wear of the brake pads 6, 7 can be decreased, and also to effect such an additional advantage that it contribute to lowering of brake drag torque, stabilization of the pad clearance, prevention of chattering noise, and the like.

With the disc brake device according to the second aspect of the present invention, the brake pad supporting parts of the torque member 2 are formed respectively of the L-shaped rails 2b, 2c which allow the brake pads 6, 7 to be inserted and removed in the radial direction of the disc rotor 1, and of the first and second bridge parts 2d, 2e of the torque member 2, the first bridge parts 2d near the brake pads cross-link between the outer ends, as viewed in the radial direction of the disc rotor 1, of the L-shaped rails 2b, 2c. Accordingly, no components extending along the outer periphery of the disc rotor 1 is present, and it is thus possible to obtain the above-mentioned technical effects and advantages without lowering the cooling ability of the disc rotor 1 and the assembling ability of the disc brake device.

What is claimed is:

1. A floating caliper disc brake device, comprising:

a first brake pad and a second brake pad opposing said first brake pad, both said brake pads being movable towards each other along a first direction to be able to clamp a disc rotor therebetween;

a caliper comprising a first caliper member supporting said first brake pad and a second caliper member connected to said first caliper member, said second caliper member having a reaction part supporting said second brake pad and a caliper bridge part at each longitudinal end thereof extending in a direction substantially parallel to the first direction, each said caliper bridge part connecting said reaction part to a respective portion of said second caliper member that is connected to said first caliper member; and a torque member holding said caliper and said brake pads and comprising an inner beam and an outer beam and a pair of first and second bridge parts at each longitudinal end of said inner and outer beams connecting said inner and outer beams and extending in a direction substantially parallel to the first direction, each pair of said first and second bridge parts at each respective longitudinal end of said torque member being spaced apart and sandwiching a respective one of said caliper bridge parts therebetween.

2. The device of claim 1, wherein each of the longitudinal ends of said inner and outer beams comprises an L-shaped rail with a respective one of said brake pads thereon, said first bridge parts being connected to respective ones of said L-shaped rails.

* * * * *